US009462598B2

(12) United States Patent
Jung

(10) Patent No.: US 9,462,598 B2
(45) Date of Patent: Oct. 4, 2016

(54) METHOD AND APPARATUS FOR CONTROLLING RESOURCE

(71) Applicant: Samsung Electronics Co., Ltd., Gyeonggi-do (KR)

(72) Inventor: Kyung Hun Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 14/516,399

(22) Filed: Oct. 16, 2014

(65) Prior Publication Data
US 2015/0103785 A1  Apr. 16, 2015

(30) Foreign Application Priority Data
Oct. 16, 2013  (KR) .................. 10-2013-0123461

(51) Int. Cl.
H04L 12/26 (2006.01)
H04W 72/08 (2009.01)
H04W 28/24 (2009.01)
H04W 24/10 (2009.01)
H04L 29/06 (2006.01)
H04N 21/00 (2011.01)
H04W 72/04 (2009.01)

(52) U.S. Cl.
CPC ........ H04W 72/087 (2013.01); H04L 65/4092 (2013.01); H04L 65/604 (2013.01); H04L 65/80 (2013.01); H04N 21/00 (2013.01); H04W 24/10 (2013.01); H04W 28/24 (2013.01); H04W 72/0413 (2013.01)

(58) Field of Classification Search
None
See application file for complete search history.

(56) References Cited

U.S. PATENT DOCUMENTS

| 7,984,179 B1* | 7/2011 | Huang | H04N 21/2662 709/231 |
|---|---|---|---|
| 2005/0076136 A1* | 4/2005 | Cho | H04L 29/06027 709/231 |
| 2005/0089092 A1* | 4/2005 | Hashimoto | H04N 19/172 375/240.03 |
| 2010/0066836 A1* | 3/2010 | Nakamura | H04N 5/232 348/159 |
| 2010/0226262 A1* | 9/2010 | Liu | H04N 21/2383 370/252 |
| 2011/0216661 A1* | 9/2011 | Imai | H04L 12/26 370/252 |
| 2011/0234793 A1 | 9/2011 | Weng et al. | |
| 2012/0061568 A1* | 3/2012 | Lee | G06K 9/00335 250/338.1 |
| 2013/0286868 A1* | 10/2013 | Oyman | H04W 24/06 370/252 |
| 2013/0297819 A1* | 11/2013 | Mittal | H04L 43/0876 709/232 |
| 2014/0002670 A1* | 1/2014 | Kolarov | H04N 17/004 348/180 |
| 2014/0064297 A1* | 3/2014 | Hirota | H04J 3/0667 370/412 |
| 2014/0177734 A1* | 6/2014 | Carmel | H04N 19/00903 375/240.26 |
| 2014/0317241 A1* | 10/2014 | Zhao | H04L 65/608 709/219 |
| 2015/0071075 A1* | 3/2015 | Ramakrishnan | H04L 65/4069 370/236 |

* cited by examiner

*Primary Examiner* — Anh-Vu Ly

(57) ABSTRACT

A method for requesting resource allocation includes receiving a target quality of a video transmitted from a server, from the server, determining whether a ratio between a quality of a transmitted video and the target quality is less than a predetermined ratio threshold value, based on a Peak signal to Noise Ratio (PSNR) or frame-rate in a predetermined time section, and requesting allocation of additional resources for the video to the server when the ratio of between the quality of the transmitted video and the target quality is less than the ratio threshold value. Other embodiments including an apparatus for requesting resource allocation are also disclosed.

16 Claims, 13 Drawing Sheets

FIG. 7

```
SDP offer a=tcap:1 RTP/AVPF
M=video 49154 RTP/AVP 99
a=pcfg:1 t=1
b=AS:315 (AS=Application-specific maximum BW:
cideo+RTP/UDP/IP header overhead)
b=RR:2500
a=rtpmap:99 H264/90000
a=fmtp:99 packetization-mode=0;
profile-level-id=42e011;
\sprop-parmeter-sets=Z0LgC5ZUCg/l,aM4BrFSAa
```

METHOD AND APPARATUS FOR CONTROLLING RESOURCE

CROSS-REFERENCE TO RELATED APPLICATION AND CLAIM OF PRIORITY

The present application is related to and claims priority from and the benefit under 35 U.S.C. §119(a) of Korean Patent Application No. 10-2013-0123461, filed on Oct. 16, 2013, which is hereby incorporated by reference for all purposes as if fully set forth herein.

TECHNICAL FIELD

At least a part of the embodiments of the present disclosure relates to a method and apparatus for controlling a resource.

BACKGROUND

The large scale facilities that are isolated from the outside, such as, a shipbuilding yard, a factory, a campus, and the like, may establish a video monitoring system using a high-speed wireless network, such as, LTE, WIFI, and the like. The video monitoring system requires a high-level of wireless resources as compared to a video call among people.

Therefore, the video monitoring system may be established so that the large size facility utilizes a frequency band to be appropriate for a place. In this instance, an Internet Protocol (IP) Multimedia Subsystem (IMS) may be utilized.

The IMS is a system that manages resources, qualities, securities, and the like of a network that uses Internet transmission technologies (IP) of High Speed Packet Access (HSPA™) Long Term Evolution (LTE™), WIFI™, a wired network communication network, and the like. Management of the wireless resources using the IMS is applied first to the $4^{th}$ generation mobile communication such as Voice over LTE (VoLTET™) and the like, and is described in the standards such as the $3^{rd}$ Generation Partnership Project (3GPP™) Technical Specification (TS) 23.228.

SUMMARY

A method for requesting resource allocation by a terminal includes receiving a target standard for a quality of a video from a server, determining whether a ratio of correspondence between the quality of a video and the target standard is less than a predetermined ratio threshold value, based on a Peak signal to Noise Ratio (PSNR) or frame-rate in a predetermined time section, and requesting allocation of an additional resource for the video to the server when the ratio of correspondence between the quality of the video and the target standard is less than the ratio threshold value.

In some embodiments, the method further includes requesting allocation of an additional resource to the server when a time greater than or equal to a predetermined time threshold value elapses while the quality of the video fails to satisfy the target standard.

In some embodiments, the target standard is set by a spatio-temporal range formed of at least two coordinates on a PSNR and frame-rate plane.

In some embodiments, the method further includes receiving the ratio threshold value from the server.

In some embodiments, the method further includes receiving a report condition from the server, and reporting a result of measuring a quality of a video when the report condition is satisfied, to the server.

An apparatus for requesting resource allocation by a terminal includes a communication unit configured to transmit or receive a signal; and a controller configured to receive a target standard for a quality of a video from a server, to determine whether a ratio of correspondence between the quality of a video and the target standard is less than a predetermined ratio threshold value, based on a Peak signal to Noise Ratio (PSNR) or frame-rate in a predetermined time section, and to request allocation of an additional resource for the video to the server when the ratio of correspondence between the quality of the video and the target standard is less than the ratio threshold value.

A method for allocating resources by a server includes transmitting, to a terminal, a target standard for quality of a video based on a Peak Signal to Noise Ratio (PSNR) or a frame-rate, and a ratio threshold value that is a standard of a ratio of correspondence between the quality of a video quality and the target standard, receiving, from the terminal, a resource request based on the target standard and the ratio threshold value, and allocating a resource to the terminal in response to the resource request.

In some embodiments, the target standard is set by a spatio-temporal range formed of at least two coordinates on a PSNR and frame-rate plane.

In some embodiments, the method further transmitting, to the terminal, a time threshold value indicating a maximum time in which the quality of a video is allowed to be out of the target standard.

In some embodiments, the method further receiving, from the terminal, a request for allocation of an additional resource when a time greater than or equal to a predetermined time threshold value elapses while the quality of the video failed to satisfy the target standard.

In some embodiments, the method further transmitting a report condition to the terminal; and receiving a result of measuring a quality of a video when the report condition is satisfied, from the terminal.

An apparatus for allocating resources includes a communication unit configured to transmit or receive a signal; and a controller configured to determine a target standard for a quality of a video based on a Peak Signal to Noise Ratio (PSNR) or a frame-rate, and a ratio threshold value that is a standard of a ratio of correspondence between the quality of a video and the target standard, transmit the target standard and the ratio threshold value to a terminal, receive a resource request, based on the target standard and the ratio threshold value from the terminal, and allocate a resource to the terminal in response to the resource request.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 is an example of an SDP offer;

DETAILED DESCRIPTION

Figure 1A:
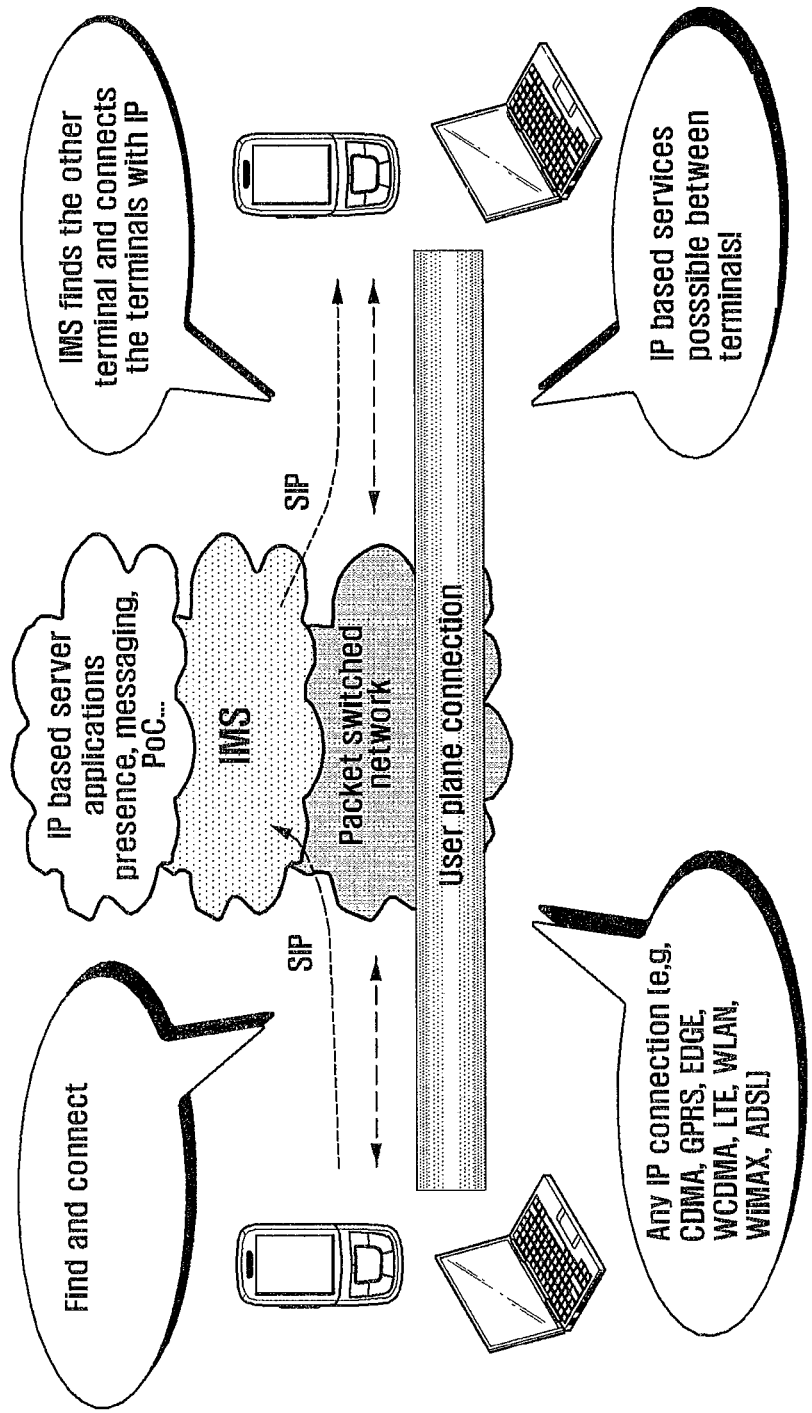
FIG. 1A is a diagram illustrating a packet switch network and an Internet Protocol (IP) Multimedia Subsystem (IMS)

FIGS. 1A through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. It will be apparent that the present disclosure is not limited to embodiments as described below and may include various modifications and changes without departing from the technical gist of the present disclosure. In describing the embodiments, descriptions of technologies which are already known to those skilled in the art and are not directly related to the present disclosure may be omitted.

Meanwhile, in the accompanying drawings, the same elements are indicated by the same reference numerals. For the same reason, in the accompanying drawings, some elements may be exaggerated, omitted, or schematically illustrated. This is in order to clearly describe the gist of the present disclosure by omitting unnecessary description not related to the gist of the present disclosure. Hereinafter, embodiments of the present disclosure will be described in detail with reference to the accompanying drawings.

Hereinafter, although the present disclosure is described by exemplifying an LTE system and an Internet Protocol (IP) Multimedia Subsystem (IMS) system, the scope of right may not be limited thereto, and may be appropriately applied to a system that automatically transmits and receives video and/or voice information through wireless communication.

FIG. 1A is a diagram illustrating a packet switch network and an IMS. As illustrated in FIG. 1A, the IMS readily provides various application services to a plurality of terminals that use a network such as LTE, and the like.

Figure 1B:
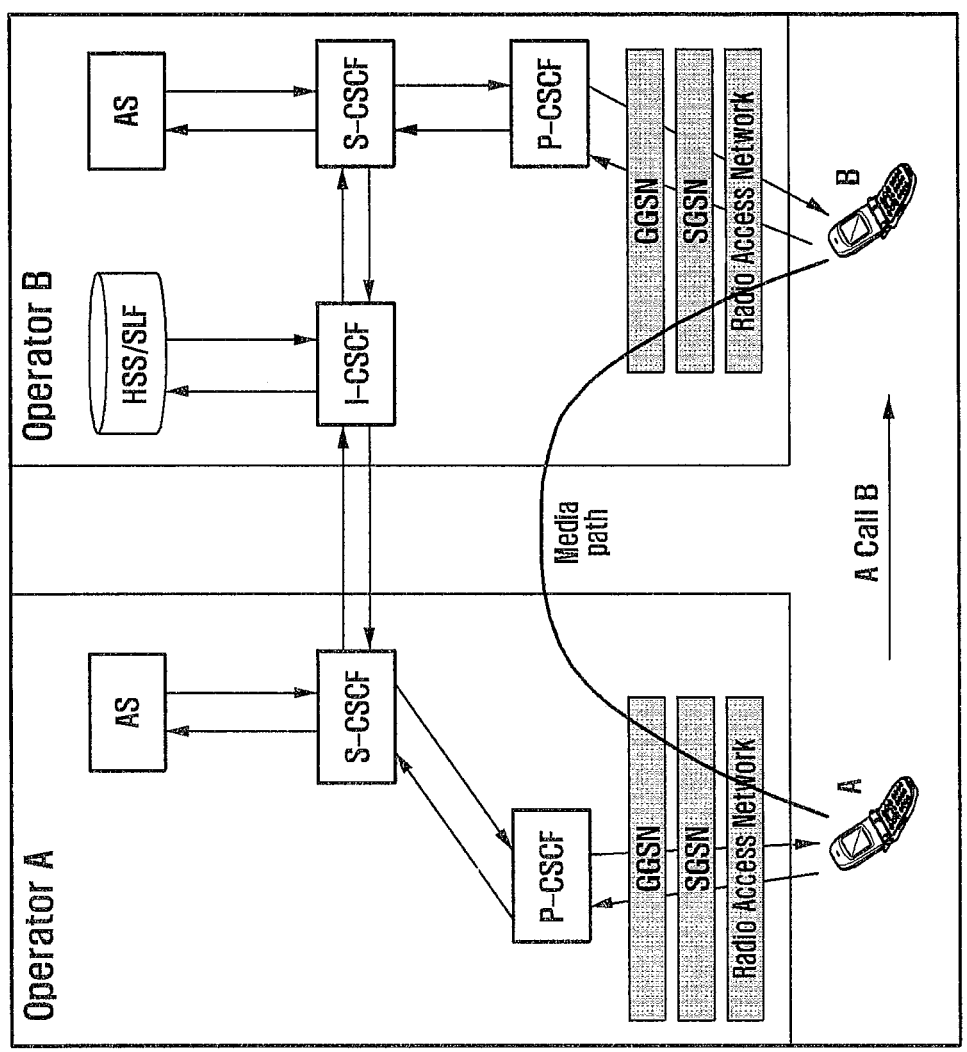
FIG. 1B is a block diagram of an IMS.

FIG. 1B is a block diagram of an IMS. Referring to FIG. 1B, the IMS can include four types of Call Session Control Functions (CSCFs), that is, a Proxy-CSCF (P-CSCF), a Serving-CSCF (S-CSCF), an Interrogating-CSCF (I-CSCF), and an Emergency-CSCF (E-CSCF). In addition, the IMS can further include a Home Subscriber Server (HSS), a Subscription Locator Function (SLF), and an Application Server (AS).

A terminal can exchange a Session Initial Protocol (SIP)/Session Description Protocol (SDP) message with a server or another terminal via the node, and determine conditions associated with a call. In this instance, the management policy of the network, resource allocation, and the like can be determined together.

Figure 2:
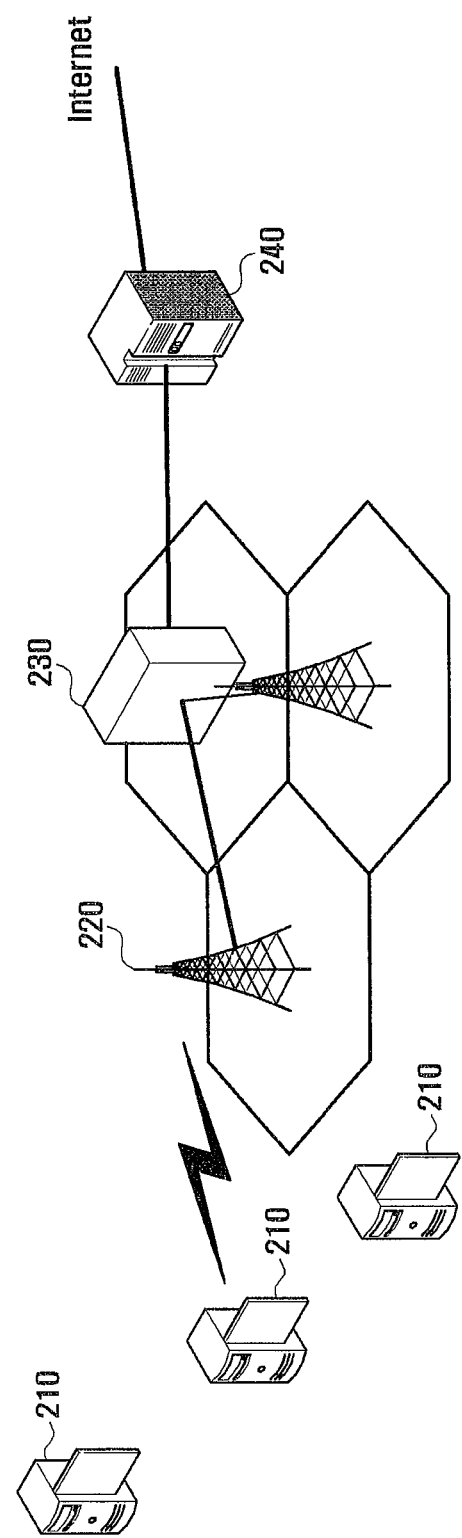
FIG. 2 is a diagram of an LTE-based wireless video monitoring system according to an embodiment of the present disclosure.

FIG. 2 is a diagram of an LTE-based wireless video monitoring system according to an embodiment of the present disclosure.

Referring to FIG. 2, a plurality of terminals 210 equipped with a camera can be connected to an eNodeB (eNB) 220 through wireless communication. The eNB 220, a gateway 230, and a server 240 are connected to one another through wired communication.

The terminal 210 photographs a video and compresses the photographed video for transmission, and the compressed video can be stored in a separate storage device or can be checked out by a manager/user through the Internet. In this instance, when a camera included in each terminal 210 compresses a video including a small amount of movement or a video including a simple background, a high video quality can be obtained even though a low bit-rate is used. However, when a video including a large amount of movement or a video including a complex background is compressed, a high bit-rate is needed to maintain a video quality.

Therefore, when the terminal compresses a video with a fixed bit rate, a video quality that is less than a level required for a content of a video can be obtained or an unnecessarily high bit-rate can be used.

An IMS-based (or other video/voice control system based) server 240 can allocate a wireless resource to the terminal 210 of the video monitoring system. Here, wireless resource allocation can include adjusting a bit-rate that the server 240 allocates to the terminal 210. According to an embodiment of the present disclosure, the server 240 allocates an appropriate bit-rate that is expended for compressed data (including one of various means for transferring a packet/stream, and other contents), based on a content of a video, so as to maintain the highest video quality and to prevent the waste of wireless resources. A process in which the server 240 allocates or reduces and allocates a bit-rate that is requested by the terminal 210 through negotiation with the terminal 210 is referred to as a Quality of Service (QoS) reservation.

Figure 3:
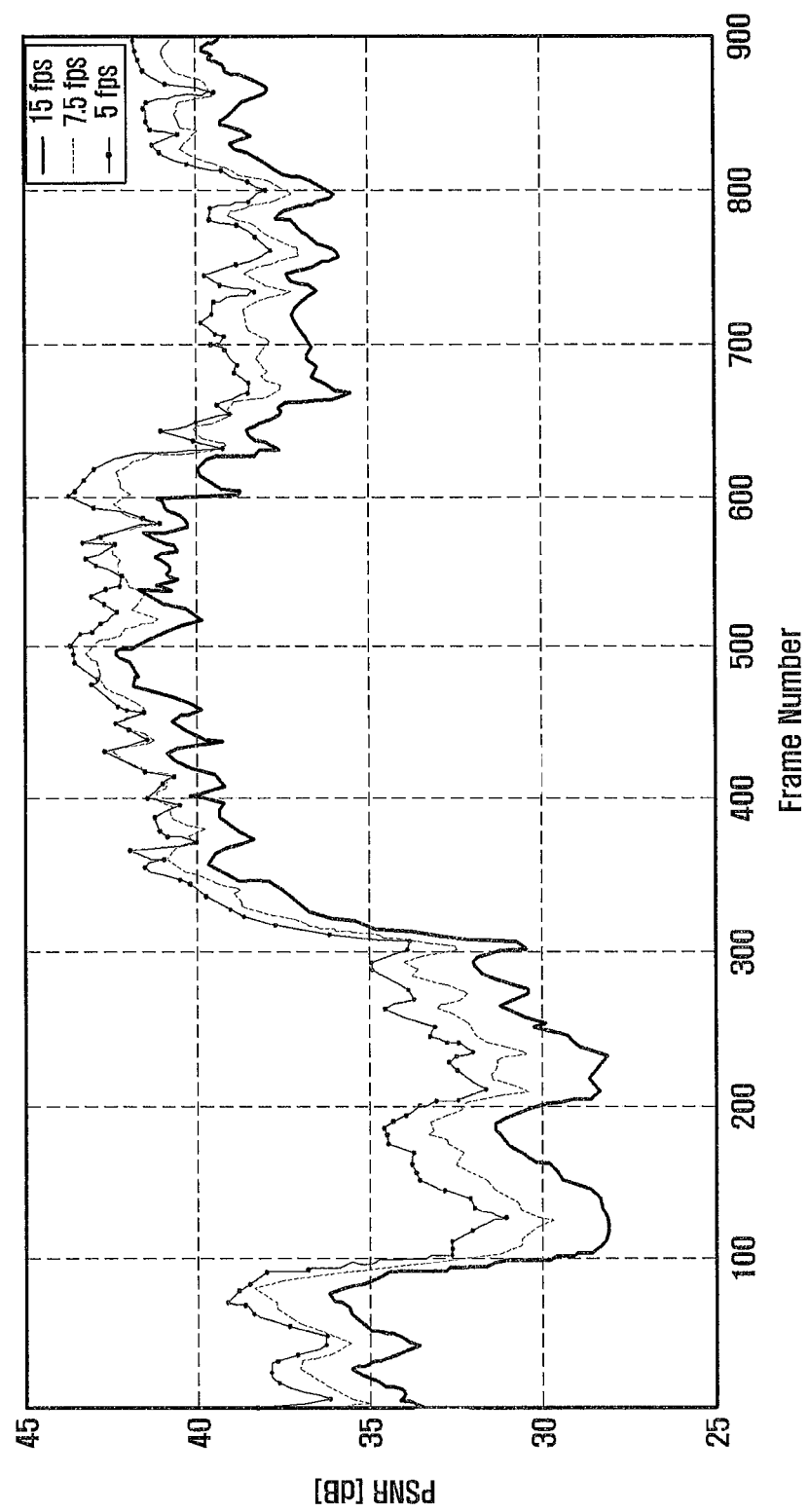
FIG. 3 is a graph of a Peak Signal to Noise Ratio (PSNR) value.

FIG. 3 is a graph of a Peak Signal to Noise Ratio (PSNR) value. The three graphs of FIG. 3 correspond to graphs associated with a PSNR of each frame when an identical video is processed (compressed) based on different frames/seconds (fps). FIG. 3 illustrates graphs when the video is processed based on 5 frames/second, 7.5 frames/second, and 15 frames/second, respectively. As a PSNR value becomes higher, a video quality becomes higher since a difference with an uncompressed frame is low.

As illustrated in FIG. 3, when the number of frames per second (frame-rate) increases in an identical bit-rate (for example, 48 kbps), a PSNR value gradually decreases. That is, when an identical bit-rate is used, as a frame-rate becomes higher, a video quality becomes lower.

FIG. 3 also describes a video quality associated with a change of a background. The first ⅓ of a video illustrated in FIG. 3 corresponds to a complex video of which a background dynamically varies, and can have a low PSNR value that is less than 35 dB on average in all frame rates. The last ⅓ of the video corresponds to a video in which only a partial area varies in a fixed background, and has a high PSNR that is greater than or equal to 40 dB on average. The middle ⅓ of the video corresponds to a video having a middle-level movement, and has a PSNR value of 42 through 43 dB on average. That is, when bit-rates are identical irrespective of frame rates, as a background video is more complex, a video quality becomes lower.

Accordingly, a bit-rate, a PSNR, and a frame-rate need to be appropriately adjusted based on an object of a video monitoring system and the content of a photographed video.

A video quality can be increased by increasing a bit-rate in a low PSNR, and a PSNR can be increased by maintaining a bit-rate and decreasing a frame-rate. In addition, a frame-rate can be increased by increasing a bit-rate in a high PSNR. Also, in a state in which a PSNR and a frame-rate are sufficiently high, even though a bit-rate is increased, a video quality is not increased any longer, which reaches a saturation state.

Figure 4:
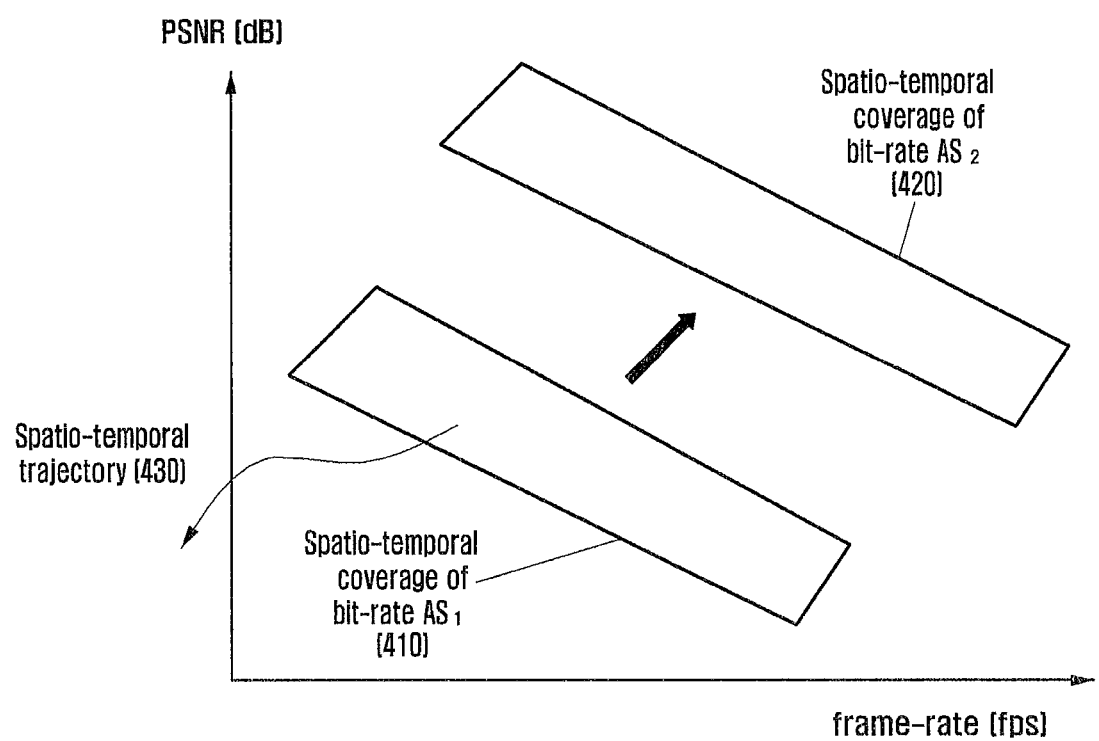
FIG. 4 illustrates a spatio-temporal range of a video.

FIG. 4 illustrates a spatio-temporal range of a video. When a video is compressed using a different bit-rate ($AS_1$, $AS_2$), a range in which a PSNR and a frame-rate are allowed to be adjusted is expressed by a spatio-temporal range 410 and 420. In this instance, $AS_1 < AS_2$ and an original video is identical.

According to the present embodiment, the server 240 expresses a target level of a video quality to the terminal 210 as a spatio-temporal range determined by at least two coordinates on a PSNR axis and frame-rate axis plane (PSNR-fps plane), and provides the same. For example, the server 240 can provide the terminal 210 with the two coordinate values. The coordinate values (first coordinates and second coordinates) can be construed as positions of facing vertexes of a rectangle on the PSNR-fps plane. According to a modified example, the two coordinate values can be coordinate values that determine other figures, such as a quadrangular shape that is different from the rectangle, a right-angled triangle, and the like. According to another embodiment, the server 240 can provide the terminal 210 with three or more coordinate values. In this instance, the three or more coordinate values can determine a pentagon that is obtained by connecting the dots indicated by the three or more coordinate values. The corresponding pentagon can indicate an acceptable spatio-temporal range.

A wireless video system can have difficulty in recognizing an object or a person in a screen when a PSNR is significantly low, and can have difficulty in recognizing a movement when a frame-rate is significantly low. Therefore, a PSNR or a frame-rate needs to maintain at least a value appropriate for each purpose. To this end, the server 240 can designate and manage a target spatio-temporal range.

According to an embodiment of the present disclosure, the spatio-temporal range can be determined by three or more coordinates on the PSNR-fps plane. For example, the three or more coordinates can indicate vertexes of a pentagon indicating a spatio-temporal range. The terminal 210 can generate a pentagon based on the transferred coordinates and regards the same as an acceptable spatio-temporal range.

The terminal 210 can determine whether a compressed video that the terminal 210 transmits satisfies the target level, based on the spatio-temporal range as shown in FIG. 4. That is, the terminal 210 can determine a PSNR and a frame-rate of a compressed video, and can determine that a QoS is secured when the determined PSNR and the determined frame-rate are within the spatio-temporal range.

In addition, when the terminal 210 is not able to obtain both a PSNR and a frame-rate that satisfy a target level, in a predetermined bit-rate, the terminal 210 can adjust a compression scheme or request additional allocation of a wireless resource from the server 240. For example, when a PSNR and a frame-rate of a compressed video is beyond the spatio-temporal range, in a predetermined bit-rate, the terminal 210 can adjust a compression scheme or request additional allocation of a wireless resource from the server 240.

Conversely, when it is determined that a sufficient quality level can be obtained with a smaller amount of resource than an amount of currently allocated wireless resource, the terminal 210 can return a residual wireless resource to an IMS so that the resource can be utilized for other terminals or services. In this manner, the terminal 210 moves the PSNR and the frame-rate of the compressed video within the spatio-temporal range, so as to achieve the quality of the target level.

In addition, according to an embodiment of the present disclosure, the terminal 210 extracts (obtains) a spatio-temporal trajectory 430, and provides the server 240 with the obtained spatio-temporal trajectory 430 periodically and/or when a predetermined condition is satisfied. The server 240 can control an amount of resource provided to the terminal 210, based on the received spatio-temporal trajectory.

Figure 5:
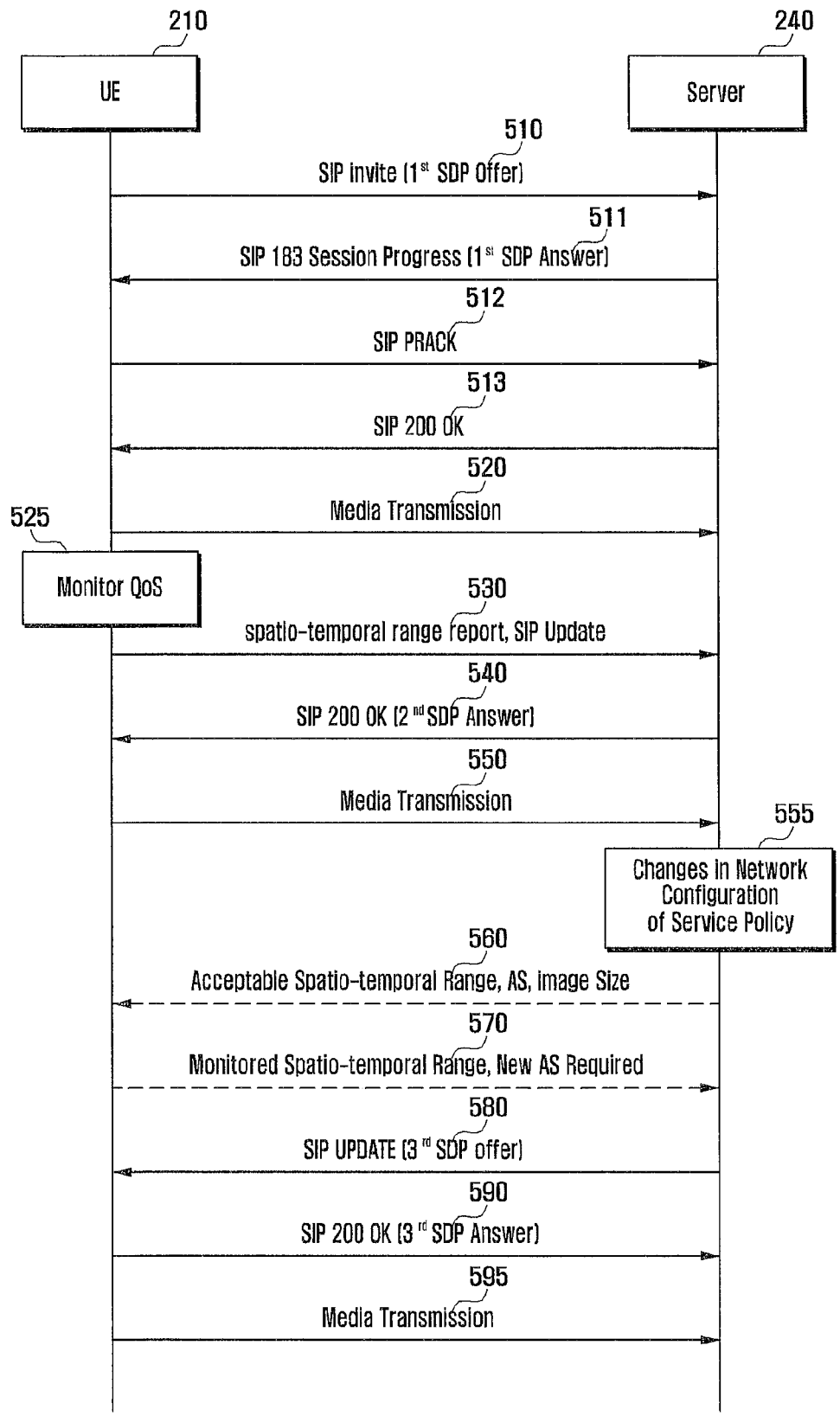
FIG. 5 is a flowchart illustrating a wireless resource allocation process according to an embodiment of the present disclosure.

FIG. 5 is a flowchart illustrating a wireless resource allocation process according to an embodiment of the present disclosure. Referring to FIG. 5, a process is illustrated, in which the server 240 allocates a wireless resource to the terminal 210, and the terminal 210 allocates a wireless resource to the server 240, based on an IMS.

Figure 6:
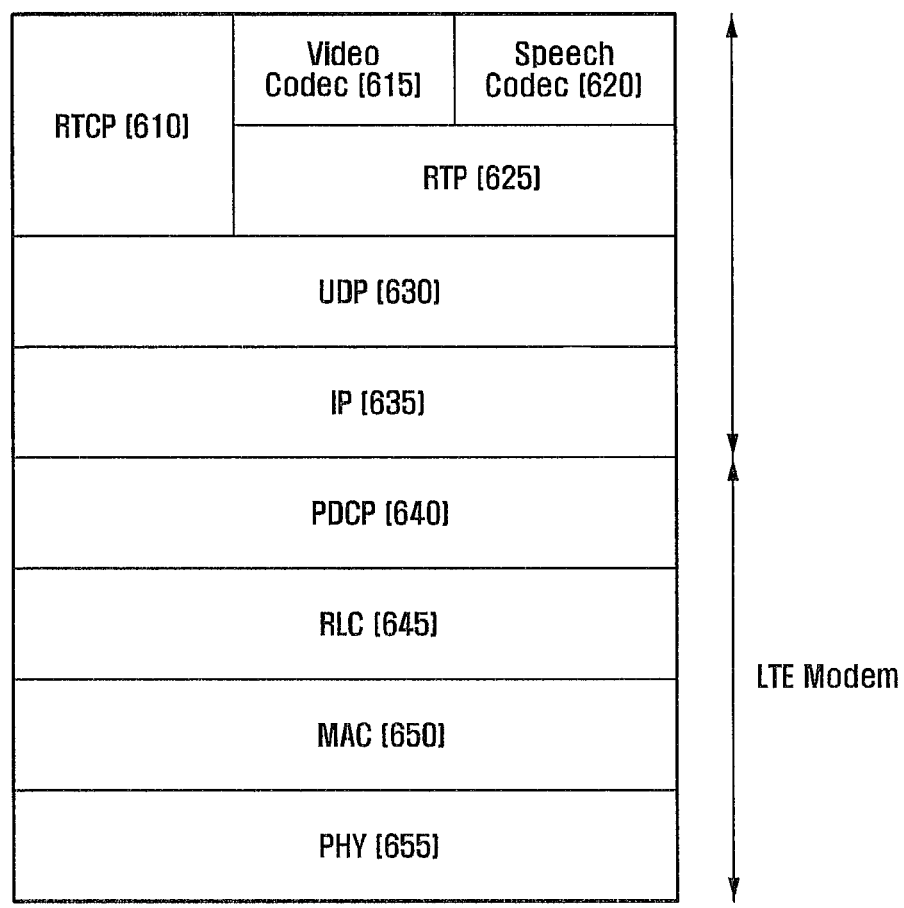
FIG. 6 is a diagram of a protocol of a terminal according to an embodiment of the present disclosure.

FIG. 6 is a block diagram of a protocol of the terminal 210 according to an embodiment of the present disclosure.

Referring to FIG. 6, a structure of a protocol of the terminal 210 can include an RTP Control Protocol (RTCP) layer 610, a video codec 615, a voice codec 620, a Real-time Transport Protocol (RTP) layer 625, a User Datagram Protocol (UDP) layer 630, an Internet Protocol (IP) layer 635, a Packet Data Convergence Protocol (PDCP) layer 640, a Radio Link Control (RLC) layer 645, a Media Access Control (MAC) layer 650, and a Physical (PHY) layer 655.

A video is photographed by a camera and transferred to the video codec 615. The video codec 615 compresses video data. The RTP layer 625 can execute operations for adding an RTP header to compressed video data and/or for converting video data into an RTP format. The UDP layer 630 executes operations for attaching a UDP header to the video data converted into the RTP format and/or for converting the video data converted into the RTP format into a UDP format. The IP layer 635 executes operations for adding an IP header to the video data converted into the UDP format and/or for converting the video data converted into the UDP format into an IP format. The data converted into the IP format can be transmitted to an eNB through a modem. In this instance, a terminal and a server can negotiate over a required bit-rate based on an IMS, in a state in which an RTP header, a UDP header, and an IP header are all attached to the video data. The modem can execute protocol conversion and transmission and reception of a signal, which correspond to the PDCP layer 640, the RLC layer 645, the MAC layer 650, and the PHY layer 655.

Operations 510 through 513 of FIG. 5 show a process in which the terminal 210 and the server 240 negotiate over a video compression condition.

In operation 510, the terminal 210 transmits, to the server 240, an SIP Invite message including an SDP offer. The SDP offer can include information associated with negotiation about a video compression condition.

FIG. 7 is an example of an SDP offer. Here, b=AS:315 indicates that a terminal suggests, to a server, transmission with a bit-rate of 315 kbps. Data transmitted with 315 kbps is data in an IP format, and thus, a part indicating a video itself and RTP, UDP, and IP headers are all included.

In operations 511 through 513, the terminal 210 and the server 240 agree on this condition, and the terminal 210 transmits a compressed video to the server 540 in operation 520.

In operation 511, the server 240 transmits an SDP response (Answer) to the terminal 210. The SDP response can include an indicator indicating that the server agrees on the SDP offer of the terminal. According to a modified example, the SDP response can include a new proposal or an indicator that requests another proposal. The SDP offer can be included in, for example, an SIP 183 Session Progress message for transmission. Here, it is assumed that the SDP response includes an indicator indicating that the server agrees on the SDP offer of the terminal.

In operation 512, the terminal 210 transmits an SIP Provisional Response ACKnowledgement (PRACK) message to the server 240. The SIP PRACK message is a preliminary ACK message used before a session is established. In operation 513, the server 240 transmits an SIP 200 OK message to the terminal 210. The SIP 200 OK message indicates that the session is established well. In operation 520, the terminal 210 transmits a video through the established session.

In operation 525, while compressing and transmitting the video to the server, the terminal 210 determines whether a state of video data generated by a video codec 615 is within the acceptable spatio-temporal range. For example, when a state of the generated video data stays outside the spatio-temporal range for at least a predetermined period of time (T), the terminal 210 attempts to change a compression scheme. According to another embodiment, when a ratio of a state in which video data of a predetermined time range stays outside the spatio-temporal range exceeds a predetermined value, the terminal 210 attempts to change a compression scheme. According to a modified embodiment, immediately operation 530 can be executed without an attempt to change a compression scheme.

Even when the change of the compression scheme fails to move the state of the video data within the spatio-temporal range, the terminal 210 can request increasing a bit-rate from a server through a message, in operation 530. The message for requesting increasing of the bit-rate can be included in, for example, an SIP update message, and can be transferred.

When the message that requests increasing the bit-rate is received, the server 240 determines whether to allow the increase of the bit-rate. When the server 240 determines the increase of the bit-rate of the terminal 210, the server 240 transmits, to the server 240, a message that allows the increase of the bit-rate, in operation 540. The message indicating that the increase of the bit-rate is allowed can be included in, for example, an SIP 200 OK message, for transferring. Subsequently, the terminal 210 receives additional allocation of a wireless resource from the server 240. In operation 550, the terminal 210 can continuously transmit video data to the server 240, based on the increased bit-rate.

According to a modified example, the terminal 210 can transmit, to the server 240, information associated with the state of the compressed video data, periodically and/or when a predetermined condition is satisfied. Whether the predetermined condition is satisfied can be determined based on whether the compressed video data is out of the spatio-temporal range. For example, the determination can be made based on a ratio of time in which the compressed video data is out of the spatio-temporal range in a predetermined time range and/or a length of time in which the compressed video data is continuously out of the spatio-temporal range.

The information associated with the state of the compressed video data can include, for example, a PSNR of the compressed video data. To obtain the PSNR of the compressed video data, comparison with an original video or information corresponding thereto is required and thus, the terminal 210 needs to obtain and provide the PSNR. According to a modified example, the information associated with the compressed video data can further include a frame-rate of the compressed video data. The server 240 directly obtains a frame-rate of the compressed video data from the compressed video data and thus, the terminal 210 may not transmit the frame-rate of the compressed video data. According to another modified example, the information associated with the state of the compressed video data can include information associated with whether the compressed video data corresponding to a predetermined time range is within the spatio-temporal range and/or information indicating a ratio of time in which the compressed video data corresponding to the predetermined time range stays in the spatio-temporal range, instead of the PSNR.

The server 240 receives information associated with the compressed video data, and determines whether the compressed video data corresponding to a predetermined time range from the time of the reception is within the spatio-temporal range and/or a ratio of time in which the compressed video data corresponding to the predetermined time range stays in the spatio-temporal range. The server 240 can directly receive, from the terminal 210, basic information for recognizing the information or can analyze the compressed video data and obtain the basic information. The server 240 can determine whether to change the bit-rate of the terminal 210, based on a ratio of time in which the compressed video data corresponding to the predetermined time range stays in the spatio-temporal range and/or a length of a continuous time in which the compressed video data is out of the spatio-temporal range. A determination on whether to change the bit-rate of the terminal 210 can be identical or similar to the determination that the terminal 210 executes in operation 525.

When the server 240 determines to change the bit-rate of the terminal 210, the server 240 can transmits an SIP UPDATE message to the terminal 210 so as to indicate the changed bit-rate. The terminal 210 generates video data based on the indicated bit-rate, and transmits the same to the server 240.

Although the above described embodiment exemplifies the case of increasing the bit-rate for video data, the server 240 and/or terminal 210 can execute the similar operations to decrease the bit-rate when the state of the video data is similar to the acceptable spatio-temporal range.

In operation 555, when the bit-rate that can be allocated to the terminal is changed as a network structure is changed or traffic is increased, the server 240 can determine whether the event is generated.

The server 240 that receives compressed videos from terminals located in various cells in a wireless network can need to generally adjust bit rate (AS) values allocated to the terminals, when a transmission condition is changed due to weather or the like, when a high bit-rate needs to be allocated to predetermined terminals that are in charge of an important video, and the like. In operation 555, it is determined whether the case is generated.

Whether the server 240 allocates a relative weight based on a priority of each terminal, and allocates or reallocates a bit-rate to each terminal can be calculated based on a mathematical method such as a linear programming and the like.

In particular, the server 240 determines, for each terminal, a transmission priority in a corresponding cell, a priority in a predetermined cell group, and a priority in the whole network, and the priority can be different from an order of an allocated bit-rate in the corresponding cell, the predetermined cell group, and the whole network.

Each terminal can be included in a plurality of cell groups, and a priority of a corresponding cell (k) can be expressed by cell_id_k, n, a priority in a cell group (1, 2, . . . , and k) can be expressed by cell_id_1, . . . , and cell_id_k, n, and a priority in a whole network (all) can be expressed by cell_id_all, n. (n is a natural number).

The allocation of a transmission capacity remaining, from the entire transmission capacity, after allocating a transmission capacity to a call, a data service, and the like, with respect to a video monitoring system can be mathematically defined as follows:

$AS_{Total} = AS_1 + AS_2 + \ldots + AS_N$. ($AS_i$ is 0 or a positive integer, the number of terminals=$N$)

A weight in a corresponding cell (k) is expressed by cell_id_k, w.

A weight in a cell group (1, 2, . . . , and k) is expressed by cell_id_1, . . . , and cell_id_k, w.

A weight in the whole network (all) is expressed by cell_id_all, w (in this instance, w is a real number).

Distribution/redistribution of a bit-rate to each terminal corresponds to a linear programming problem using the following condition 1. For example, AS values that satisfy condition 1, that is, that enable $$\max \sum_i w_i AS_i \quad \text{condition 1}$$

to be the largest value, can be an optimal distribution scheme.

$$\sum_i w_i AS_i$$

A system for allocation can allocate a bit rate based on various constraints, for example, predetermined $AS_{Total}$, a condition that requires $AS_i > 0$ for a predetermined i, and the like. When a bit rate, which is reallocated based on a reported spatio-temporal range, a priority stored in the server, a weight, and the like, is calculated to satisfy $AS_i > 0$, and is allocated in advance to a terminal, is different from the bit-rate requested by the terminal, the server 240 allocates a new bit-rate and terminates video transmission for a terminal of which a bit-rate is calculated to be less than 0.

When an event that requires reallocation is generated in a network in operation 555, the server 240 determines, for each terminal, a priority in a corresponding cell, a priority in a predetermined cell group, and a priority in the whole network, and recalls a bit-rate allocated to a terminal having a low priority when it is required, and allocates the same to a terminal having a high priority, in operation 560.

That is, in operation 560, the server 240 transmits, to the terminal 210, a new quality condition, a bit rate, an image size, a spatio-temporal range, and the like. In this instance, the information can be transmitted through a separate data transmission channel, as opposed to an SIP/SDP message. The existing SIP/SDP does not have a message for this type of transmission. According to a modified example, a message for transferring the described information can be transmitted through the SIP/SDP by partially modifying the SIP/SDP.

In operation 570, the terminal 210 transmits, to the server 210, a trajectory of the spatio-temporal range recoded until the present, and can request a desired bit-rate value from the server 240.

The server 240 transmits, to the terminal 210, an SIP update message based on a new transmission condition in operation 580, and the terminal 210 receives a wireless resource through negotiation over the new condition in operation 590. Through the above process, the terminal 210 can transmit a video to the server in operation 595.

Figure 8:
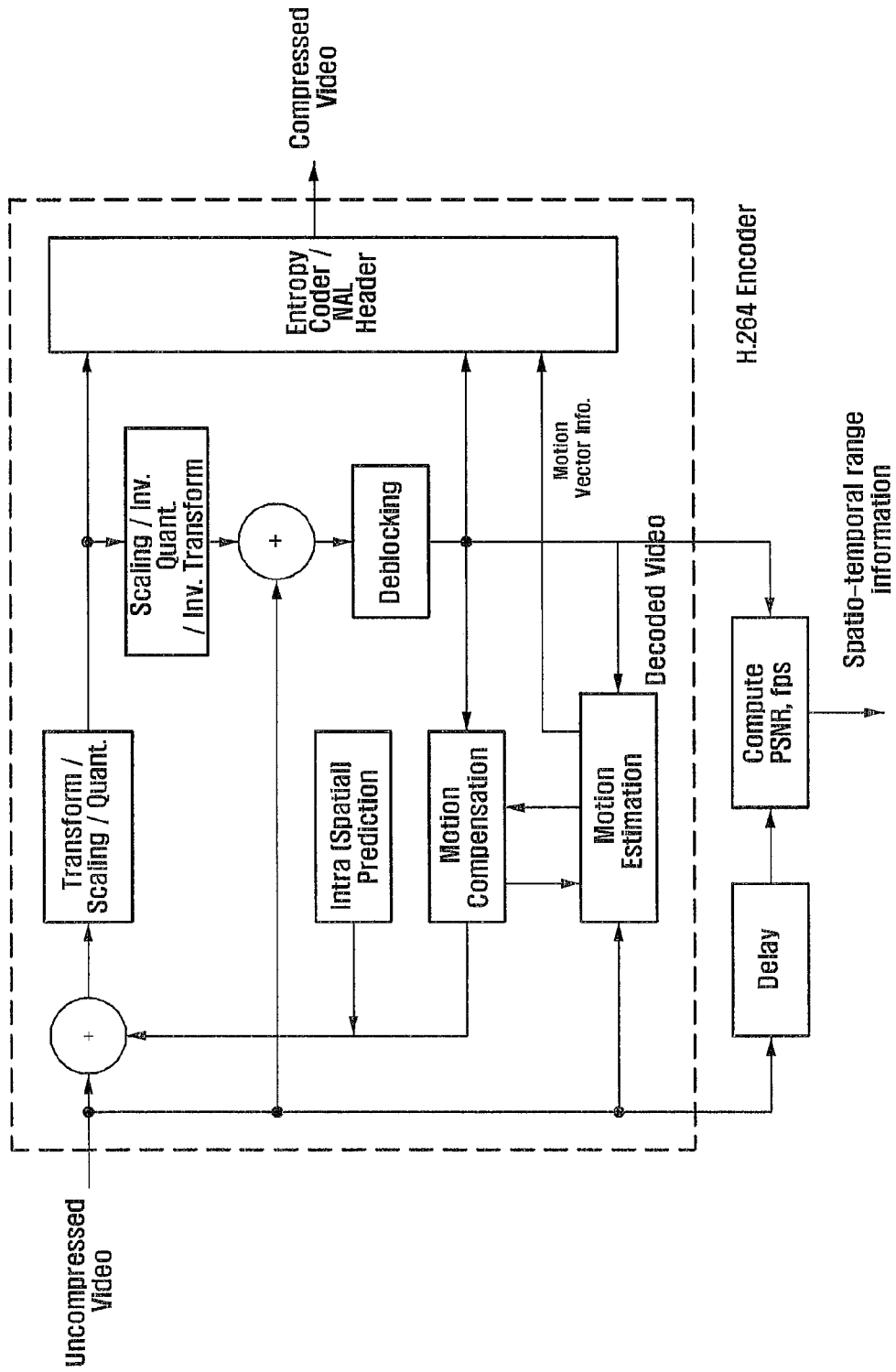
FIG. 8 is a diagram of a configuration of a compressor (codec) of the terminal according to an embodiment of the present disclosure.

FIG. 8 is a diagram of a configuration of a compressor (codec) of the terminal 210 according to an embodiment of the present disclosure.

The server 240 can calculate frame-rate information in a process of restoring a received video, but may not determine PSNR information only through the received video. The PSNR information can be obtained by the terminal 210. As illustrated in FIG. 8, the terminal 210 can calculate the PSNR information by comparing an original video (uncompressed video) with a video reconstructed after each video frame is compressed in a video compressor. That is, the terminal 210 can directly recognize whether the current compressed state satisfies the spatio-temporal range. The terminal 210 can need to provide the server 240 with the PSNR information so that the server 240 determines whether the current compressed state satisfies the target spatio-temporal range.

In FIG. 8, a PSNR value of each frame and the average number of frames per second (frame per second (fps)) from a point in the past to a point in the time when a corresponding frame is compressed, can be recorded as coordinates on a PSNR-fps two-dimensional plane.

Figure 9:
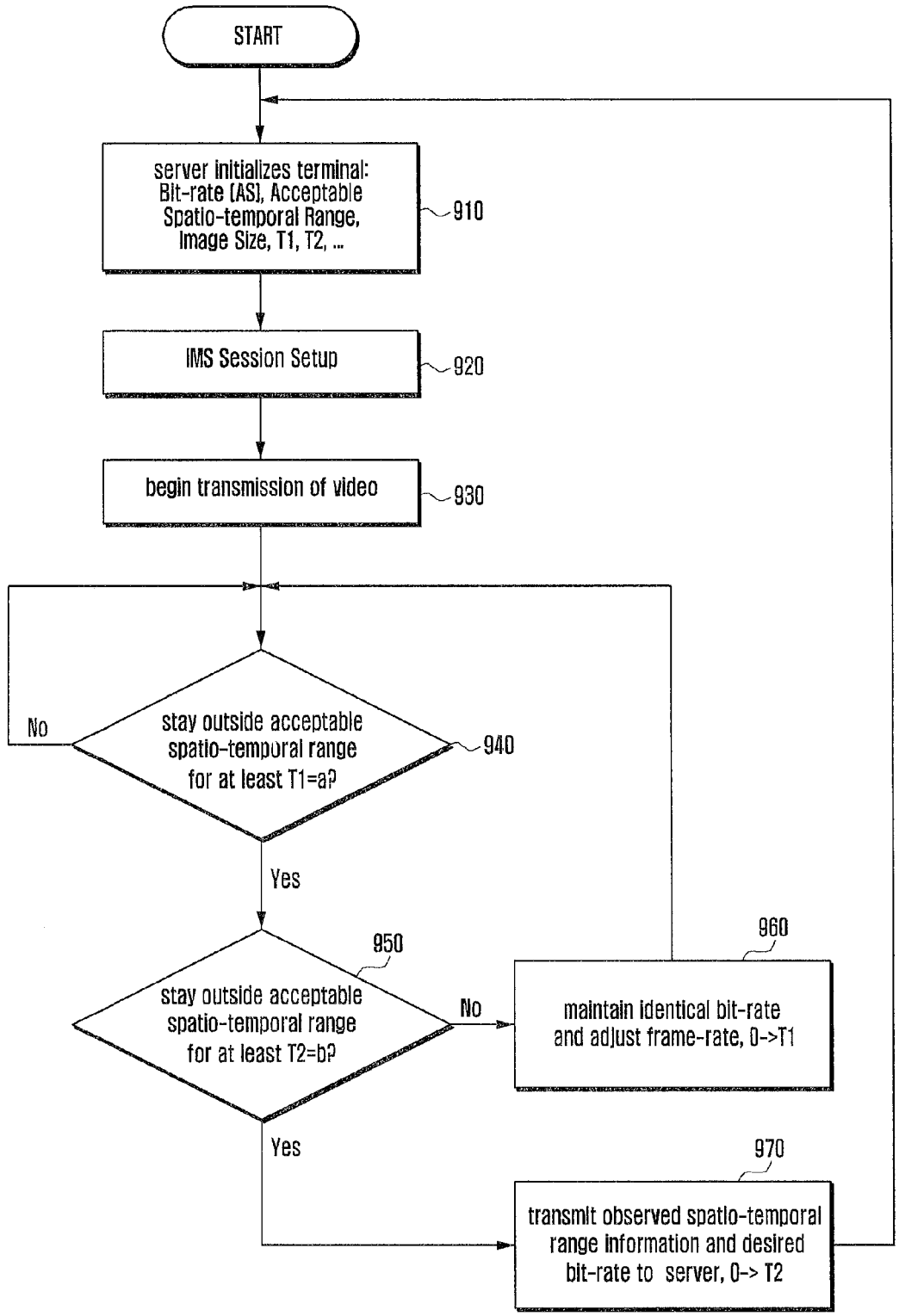
FIG. 9 is a flowchart illustrating a wireless resource negotiation process according to a first embodiment of the present disclosure.

FIG. 9 is a flowchart illustrating a wireless resource negotiation process according to a first embodiment of the present disclosure. The flowchart can be configured to be different according to a purpose of a service and an available bit-rate.

In operation 910, the server 240 initializes a spatio-temporal range acceptable for the terminal 210, a bit-rate (AS), an image size, threshold values of timers T1 and T2, and the like. In operation 920, the terminal 210 can set up an IMS session.

In operation 930, the terminal 210 can negotiate over a wireless resource based on the above condition, and transmits a video to the server 240.

In operation 940, the terminal 210 determines whether a current state of a compressed video from a video compressor satisfies a QoS. A criterion for the determination is the above described spatio-temporal range. The terminal 210 determines whether the state of the compressed video is out of the spatio-temporal range for at least a predetermined period of time, for example, at least a seconds. For the determination of operation 940, a timer T1 is used. When the state of a video to be transmitted is out of the spatio-temporal range, the timers T1 and T2 are triggered. When the state of the video to be transmitted comes within the spatio-temporal range, the timers T1 and T2 are initialized. However, for example, when T1 is not initialized and predetermined a seconds elapse, that is, when a seconds elapse while the state of the video to be transmitted is out of the spatio-temporal range, the process can proceed with operation 950.

When a time in which the video to be transmitted is out of the spatio-temporal range is greater than the predetermined period of time, that is, a seconds, operation 950 can be executed. Even though the process proceeds with operation 950, the timer T2 is continuously operated. In operation 950, the terminal 210 determines whether the time in which the state of the video is out of the acceptable spatio-temporal range is greater than a seconds, and whether b seconds elapse without initialization of the timer T2.

Although the time in which the state of the video to be transmitted is out of the spatio-temporal range is greater than a seconds, when the timer T2 is initialized before b seconds elapse, the process can proceed with operation 960. The terminal 210 maintains an identical bit-rate, adjusts a frame-rate, and resets the timers T1 and T2, in operation 960.

When the time in which the state of the video to be transmitted is out of the spatio-temporal range is greater than the predetermined period of time of b, the process proceeds with operation 970. In operation 970, the terminal 210 transmits, to the server 240, information associated with an observed spatio-temporal trajectory and additional allocation of a resource desired by the terminal 210, and resets the timer T2.

Figure 10:
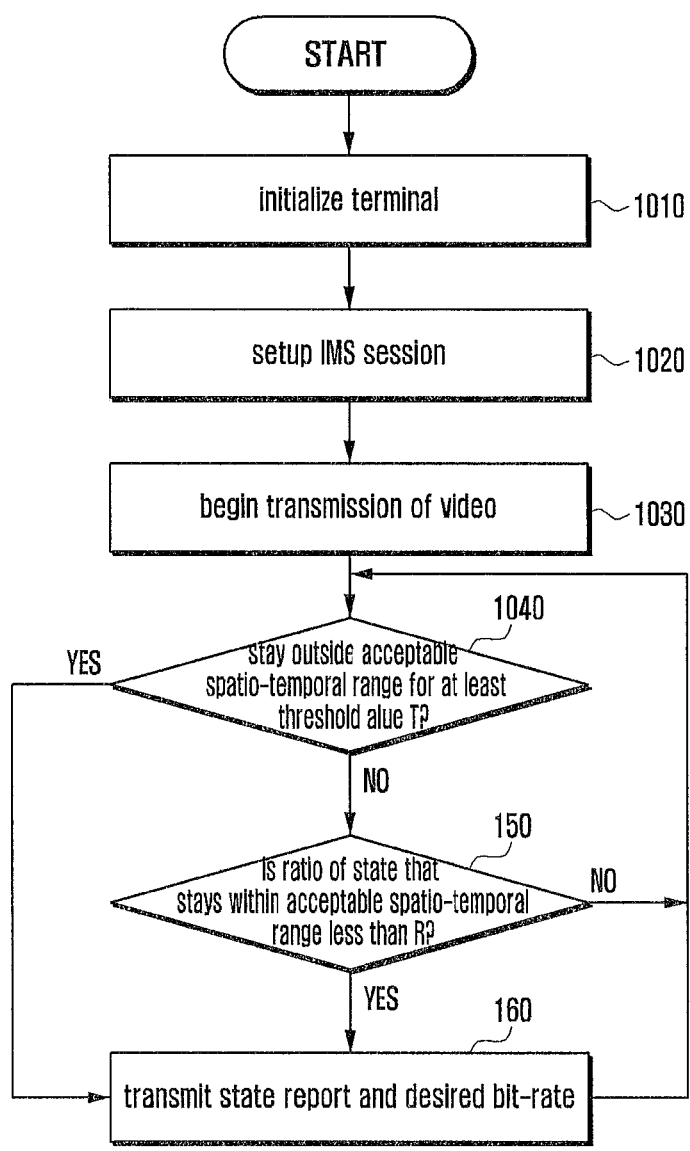
FIG. 10 is a flowchart illustrating a wireless resource negotiation process according to a second embodiment of the present disclosure.

FIG. 10 is a flowchart illustrating a wireless resource negotiation process according to a second embodiment of the present disclosure. The flowchart can be configured to be different according to a purpose of a service and an available bit-rate.

In operation 1010, the terminal 210 is initialized. The terminal 210 receives information associated with a QoS condition from the server 240. The information associated with the QoS condition can further include information indicating an acceptable spatio-temporal range, a time threshold value T, and a ratio threshold value R. A time threshold value T and/or a ratio threshold value R is fixed to a predetermined value, transmission of the time threshold value T and/or the ratio threshold value R can be omitted. For the initialization, the server 240 can transmit, to the terminal 210, an indicator indicating a bit-rate (AS) and/or an image size.

In addition, the server 240 can transmit, to the terminal 210, an indicator indicating a condition for the terminal 210 to report the state and a format of the state report. The condition for reporting the state can include, for example, a predetermined elapsed time (a periodical transmission scheme) and/or occurrence of a predetermined event (rapid deterioration of a video quality). The terminal 210 can transmit, to the server 240, information associated with the observed spatio-temporal trajectory and information associated with the state of other videos, when the corresponding condition is satisfied.

In operation 1020, the terminal 210 can set up an IMS session.

In operation 1030, the terminal 210 can negotiate over a wireless resource based on the above condition, and begins transmission of a video to the server 240.

In operation 1040, the terminal 210 determines whether a video compressed by a video codec stays outside the spatio-temporal range for at least a threshold value T. A process of the determination is similar to the determination of operations 940 and 950 of FIG. 9. When the time in which the state of the video to be transmitted is out of the spatio-temporal range is greater than the predetermined time threshold value T, the process proceeds with operation 1060. In operation 1060, the terminal 210 transmits, to the server 240, additional allocation of a resource desired by the terminal 210 for the normal video transmission. The terminal 210 can report information associated with an observed spatio-temporal trajectory, together, in operation 1060. When the time in which the state of the video to be transmitted is out of the spatio-temporal range is not greater than the predetermined time threshold value T, the process proceeds with operation 1050.

In operation 1050, the terminal 210 determines, based on a predetermined time section, whether a ratio of a state in which the video compressed by the video codec stays within the spatio-temporal range is less than the ratio threshold value R. When the ratio of the state in which the video to be transmitted stays within the spatio-temporal range is less than the predetermined ratio threshold value R, the process proceeds with operation 1060. In operation 1060, the terminal 210 transmits, to the server 240, additional allocation of a resource desired by the terminal 210 for the normal video transmission. The terminal 210 can report information associated with an observed spatio-temporal trajectory, together, in operation 1060. When the ratio of the state in which the video to be transmitted stays within the spatio-temporal range is greater than or equal to the predetermined ratio threshold value R, the process proceeds with operation 1040.

In the embodiment of FIG. 10, when any one of the threshold values T and R is not satisfied, the terminal 210 requests additional resource allocation from the server 240. However, according to a modified example, only one of the two conditions can be used for determining whether to request additional resource allocation.

Figure 11:
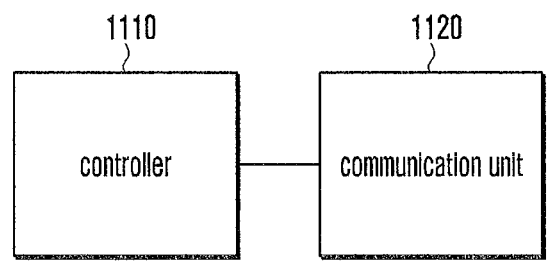
FIG. 11 is a block diagram of the terminal according to an embodiment of the present disclosure.

FIG. 11 is a block diagram of the terminal 210 according to an embodiment of the present disclosure. Referring to FIG. 11, the terminal 210 according to an embodiment of the present disclosure can include a controller 1110 and a communication unit (e.g. a transceiver) 1120. The controller 1110 can control each component part of the terminal 210 and executes determination and calculation, for executing at least a part of the described embodiments. The controller 1110 can determine whether to execute additional resource allocation, as described in the embodiments of FIGS. 5, 9, and 10, or other embodiments. The communication unit 1120 includes an R/F circuit to transmit and receive a signal required for executing at least a part of the described embodiments. The terminal 210 according to embodiments of the present disclosure includes other common elements such as a memory, display, or I/O unit, however, such elements are well known and their detail descriptions are omitted for the purpose of simplicity.

Figure 12:
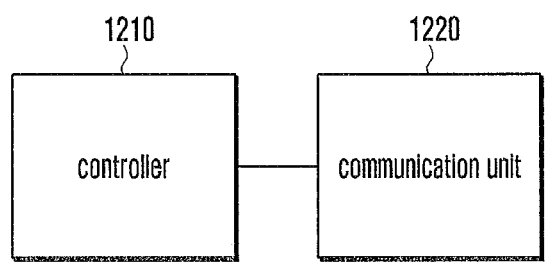
FIG. 12 is a block diagram of a server according to an embodiment of the present disclosure.

FIG. 12 is a block diagram of the server 240 according to an embodiment of the present disclosure. Referring to FIG. 11, the server 240 according to an embodiment of the present disclosure can include a controller 1210 and a communication unit 1220. The controller 1210 can control each component part of the server 240 and executes determination and calculation, for executing at least a part of the described embodiments. The controller 1210 can execute determination associated with resource allocation and can execute resource allocation, as described in the embodiment of FIG. 5. The communication unit 1220 includes a R/F circuits to transmit and receive a signal required for executing at least a part of the described embodiments. The server according to embodiments of the present disclosure includes other common elements such as a memory, display, or I/O unit, however, such elements are well known and their detail descriptions are omitted for the purpose of simplicity.

The present disclosure provides a method of maximizing a video quality while minimizing the use of a wireless resource, in a state in which a resource of a wireless video monitoring system formed of a terminal and a server that manages the terminal, is managed using an IMS. This may not be affected by a predetermined network structure, and be applied to various types of wired and wireless networks, such as, LTE, WIFI, a wired network, and the like.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for requesting resource allocation by a terminal, the method comprising:
   receiving a target criteria for a quality of a video from a server;
   determining whether a ratio of correspondence between the quality of a video and the target criteria is less than a predetermined ratio threshold value, based on a Peak signal to Noise Ratio (PSNR) or frame-rate in a predetermined time section;
   requesting allocation of an additional resource for the video to the server, if the ratio of correspondence between the quality of the video and the target criteria is less than the ratio threshold value; and
   requesting the allocation of the additional resource to the server, if a time greater than or equal to a predetermined time threshold value elapses while the quality of the video fails to satisfy the target criteria.

2. The method of claim 1, wherein the target criteria is set by a range formed of at least two coordinates on a PSNR and frame-rate plane.

3. The method of claim 1, further comprising:
   receiving the ratio threshold value from the server.

4. The method of claim 3, further comprising:
   receiving a report condition from the server; and
   reporting a result of measuring a quality of a video if the report condition is satisfied, to the server.

5. An apparatus for requesting resource allocation by a terminal, comprising:
   a transceiver configured to transmit or receive a signal:
   a controller configured to:
   receive a target criteria for a quality of a video from a server,
   determine whether a ratio of correspondence between the quality of a video and the target criteria is less than a predetermined ratio threshold value, based on a Peak signal to Noise Ratio (PSNR) or frame-rate in a predetermined time section,
   request allocation of an additional resource for the video to the server if the ratio of correspondence between the quality of the video and the target criteria is less than the ratio threshold value, and
   request the allocation of the additional resource to the server if a time greater than or equal to a predetermined time threshold value elapses while the quality of the video fails to satisfy the target criteria.

6. The apparatus of claim 5, wherein the target criteria is set by a range formed of at least two coordinates on a PSNR and frame-rate plane.

7. The apparatus of claim 5, wherein the controller is configured to receive the ratio threshold value from the server.

8. The apparatus of claim 7, wherein the controller is configured to receive a report condition from the server, and
   to reports, to the server, a result of measuring a quality of a video if the report condition is satisfied.

9. A method for allocating resources by a server, the method comprising:
   transmitting, to a terminal, a target criteria for quality of a video based on a Peak Signal to Noise Ratio (PSNR) or a frame-rate, and a ratio threshold value that is a standard of a ratio of correspondence between the quality of a video and the target criteria;
   receiving, from the terminal, a resource request based on the target criteria and the ratio threshold value;
   receiving, from the terminal, the resource request, if a time greater than or equal to a predetermined time threshold value elapses while the quality of the video fails to satisfy the target criteria; and
   allocating a resource to the terminal in response to the resource request.

10. The method of claim 9, wherein the target criteria is set by a range formed of at least two coordinates on a PSNR and frame-rate plane.

11. The method of claim 9, further comprising:
    transmitting, to the terminal, a time threshold value indicating a maximum time in which the quality of video is allowed to be out of the target criteria.

12. The method of claim 9, further comprising:
    transmitting a report condition to the terminal; and
    receiving a result of measuring a quality of a video if the report condition is satisfied, from the terminal.

13. An apparatus for allocating resources, comprising:
    a transceiver configured to transmit or receive a signal;
    a controller configured to:
    determine a target criteria for a quality of a video based on a Peak Signal to Noise Ratio (PSNR) or a frame-rate, and a ratio threshold value that is a standard of a ratio of correspondence between the quality of a video and the target criteria; and
    transmit the target criteria and the ratio threshold value to a terminal,
    receive a resource request, based on the target criteria and the ratio threshold value from the terminal,
    receive the resource request from the terminal, if a time greater than or equal to a predetermined time threshold value elapses while the quality of the video fails to satisfy the target criteria, and
    allocate a resource to the terminal in response to the resource request.

14. The apparatus of claim 13, wherein the target criteria is set by a range formed of at least two coordinates on a PSNR and frame-rate plane.

15. The apparatus of claim 13, wherein the controller is configured to transmit, to the terminal, a time threshold value indicating a maximum time in which the quality of video is allowed to be out of the target criteria.

16. The apparatus of claim 13, wherein the controller is further configured to transmit a report condition to the terminal, and to receive a result of measuring a quality of a video if the report condition is satisfied, from the terminal.

\* \* \* \* \*